US006980950B1

(12) United States Patent
Gong et al.

(10) Patent No.: US 6,980,950 B1
(45) Date of Patent: Dec. 27, 2005

(54) AUTOMATIC UTTERANCE DETECTOR WITH HIGH NOISE IMMUNITY

(75) Inventors: Yifan Gong, Plano, TX (US); Yu-Hung Kao, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1012 days.

(21) Appl. No.: 09/667,045

(22) Filed: Sep. 21, 2000

Related U.S. Application Data

(60) Provisional application No. 60/161,179, filed on Oct. 22, 1999.

(51) Int. Cl.[7] ......................... G10L 11/02; G10L 15/20
(52) U.S. Cl. ....................... 704/210; 704/215; 704/233
(58) Field of Search ........................ 704/210, 211, 215, 704/216, 217, 226, 227, 228, 205, 206, 207, 704/233

(56) References Cited

U.S. PATENT DOCUMENTS 4,589,131 A * 5/1986 Horvath et al. ............. 704/214
5,732,392 A * 3/1998 Mizuno et al. ............. 704/233
5,774,847 A * 6/1998 Chu et al. .................... 704/237
5,809,455 A * 9/1998 Nishiguchi et al. ......... 704/214
5,937,375 A * 8/1999 Nakamura .................. 704/215
5,960,388 A * 9/1999 Nishiguchi et al. ......... 704/208
6,023,674 A * 2/2000 Mekuria ..................... 704/233
6,122,610 A * 9/2000 Isabelle ...................... 704/226
6,324,502 B1 * 11/2001 Handel et al. .............. 704/226
6,415,253 B1 * 7/2002 Johnson ...................... 704/210
6,453,285 B1 * 9/2002 Anderson et al. ........... 704/210
6,463,408 B1 * 10/2002 Krasny et al. .............. 704/217
6,691,092 B1 * 2/2004 Udaya Bhaskar et al. .. 704/265

OTHER PUBLICATIONS

Nemer et al., "Robust Voice Activity Detection Using Higher-Order Statistics in the LPC Residual Domain," IEEE Transactions on Speech and Audio Processing, vol. 9, No. 3, Mar. 2001, pp. 217 to 231.*

* cited by examiner

*Primary Examiner*—Martin Lerner
(74) *Attorney, Agent, or Firm*—W. James Brady, III; Frederick J. Telecky, Jr.

(57) ABSTRACT

An utterance detector for speech recognition is described. The detector consists of two components. The first part makes a speech/non-speech decision for each incoming speech frame. The decision is based on a frequency-selective autocorrelation function obtained by speech power spectrum estimation, frequency filter, and inverse Fourier transform. The second component makes utterance detection decision, using a state machine that describes the detection process in terms of the speech/non-speech decision made by the first component.

6 Claims, 8 Drawing Sheets

SPEECH

FRAME-DECISION

UTTERANCE DECISION

FIG. 9
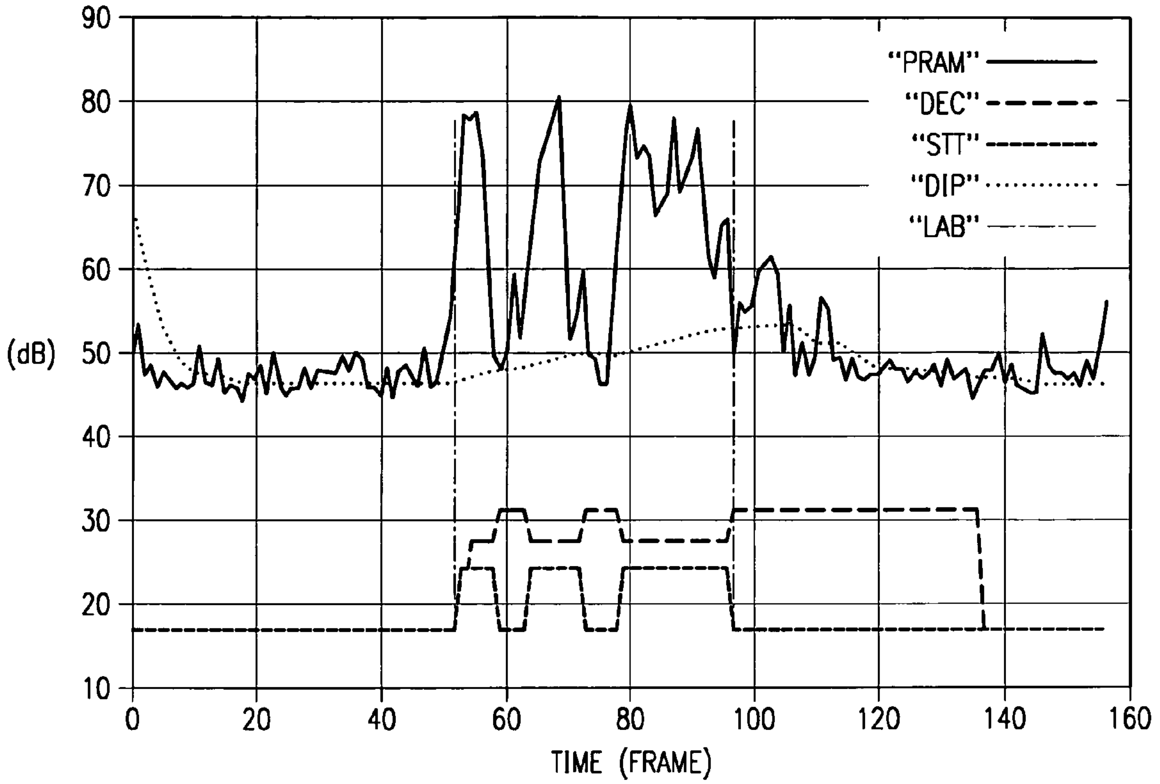
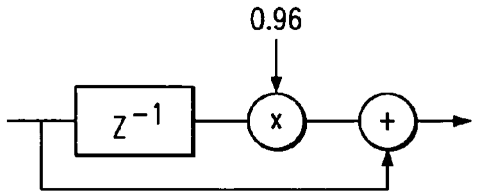
FIG. 10
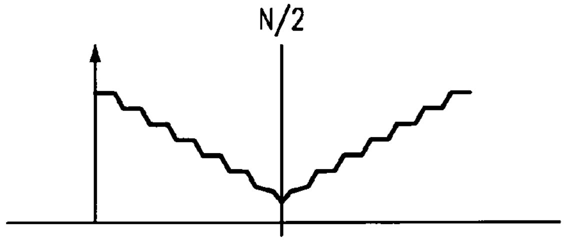
FIG. 11
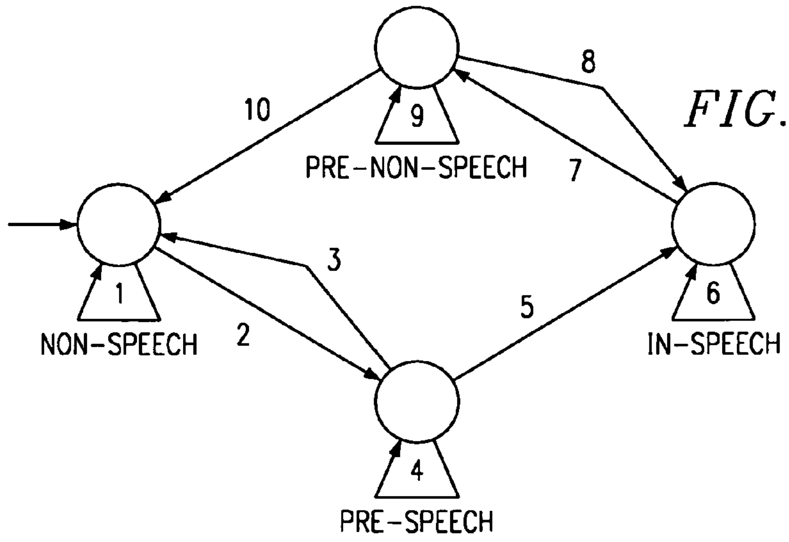
FIG. 12

AUTOMATIC UTTERANCE DETECTOR WITH HIGH NOISE IMMUNITY

This application claims priority under 35 USC § 119(e)(1) of provisional application No. 60/161,179, filed Oct. 22, 1999.

FIELD OF INVENTION

This invention relates to speech recognition and, more particularly, to an utterance detector with high noise immunity for speech recognition.

BACKGROUND OF INVENTION

Typical speech recognizers require an utterance detector to indicate where to start and to stop the recognition of the incoming speech stream. Most utterance detectors use signal energy as basic speech indicator. See, for example, J.-C. Junqua, B. Mak, and B. Reaves, "A robust algorithm for word boundary detection in the presence of noise," *IEEE Trans. on Speech and Audio Processing,* 2(3):406–412, July 1994 and L. Lamels, L. Rabiner, A. Rosenberg, and J. Wilpon, "An improved endpoint detector for isolated word recognition," *IEEE ASSP Mag.,* 29:777–785, 1981.

In applications such as hands-free speech recognition in a car driven on a highway, the signal-to-noise ratio can be less than 0 db. That means that the energy of noise is about the same as that of the signal. Obviously, while speech energy gives good results for clean to moderately noisy speech, it is not adequate for reliable detection under such a noisy situation.

SUMMARY OF INVENTION

In accordance with one embodiment of the present invention, an utterance detector with enhanced noise robustness is provided. The detector is composed of two components: frame-level speech/non-speech decision and utterance-level detector responsive to a series of speech/non-speech decisions.

DESCRIPTION OF THE DRAWINGS

FIG. 9 illustrates typical operation of the proposed utterance detector;

FIG. 10 illustrates the filter in Step 1.1;

FIG. 11 illustrates the Step 2.2 to make symmetrical;

FIG. 12 illustrates the state machine of the utterance detector;

DESCRIPTION OF PREFERRED EMBODIMENT OF THE PRESENT INVENTION

Figure 1:
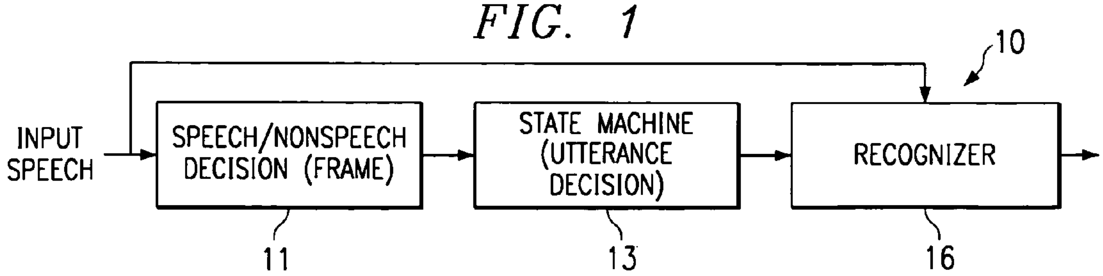
FIG. 1 is a block diagram of the utterance detector according to one embodiment of the present invention.

Referring to FIG. 1, there is illustrated a block diagram of the utterance detector 10 according to one embodiment of the present invention. The detector 10 comprises the first part which is at the frame level detector 11 which determines for each frame if there is speech or non-speech. The second part is an utterance detector 13 that includes a state machine that determines if the utterance is speech. The output of the utterance detector 13 is applied to speech recognizer 16 such that when the utterance detector recognizes speech it enables the recognizer 16 to receive speech and when the detector determines non-speech to turn off or disable the recognizer 16.

Figure 2A:
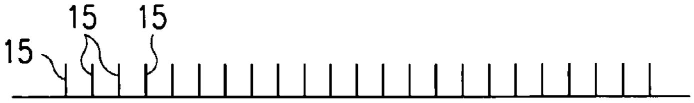
FIG. 2 is a timing diagram illustrating frame level decision and utterance level decision.
Figure 2B:
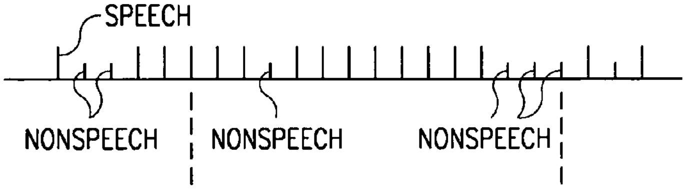
Figure 2C:
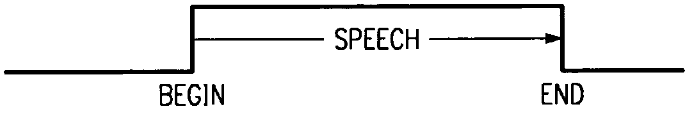
Figure 3:
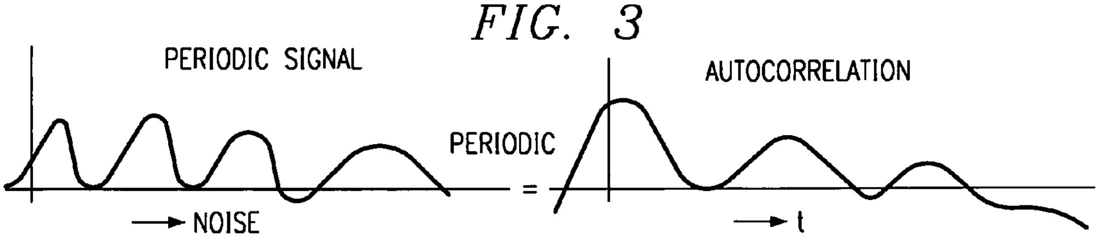
FIG. 3 illustrates equation 3 of a periodic signal illustrated on the left remaining after autocorrelation a periodic signal as illustrated on the right.

FIG. 2 illustrates the system. Row (a) of FIG. 2 illustrates a series of frames 15. In the first detector 11, it is determined if the frame 15 is speech or non-speech. This is represented by row (b) of FIG. 2. Row (c) of FIG. 2 represents the utterance decision. Detected speech in a frame at frame detector 11 causes the higher level signal and the low or lower level signals for each frame is represented by the lower level signal. In the utterance decision, only after a series of detected speech frames does the utterance detector 13 enable the recognizer.

In the prior art, energy level is used to determine if the input frame is speech. This is not reliable since noise such as highway noise could have as much energy as speech.

For resistance to noise, Applicants teach to exploit the periodicity, rather than energy, of the speech signal. Specifically, we use autocorrelation function. The autocorrelation function (correlation with signal delayed by τ) used in this work is derived from speech X(t), and is defined as:

$$R_x(\tau)=E[X(t)X(t+\tau)] \tag{1}$$

Important properties of $R_x(\tau)$ include:

$$R_x(0)\geqq R_x(\tau). \tag{2}$$

$$R_x(\tau)=R_S(\tau)+R_N(\tau)$$

If S(t) and N(t) are independent and both ergodic with zero mean, then for X(t)=S(t)+N(t):

$$R_x(\tau)=R_S(\tau)+R_N(\tau) \tag{4}$$

Figure 4:
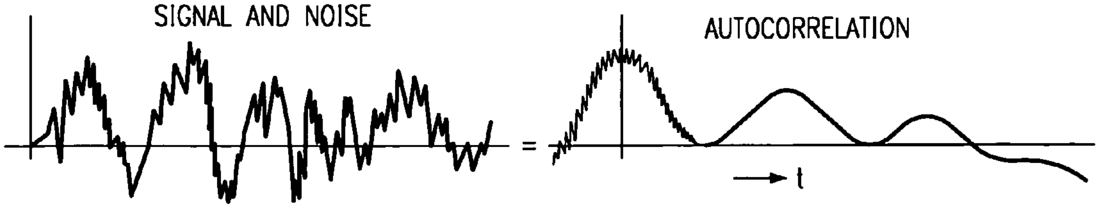
FIG. 4 illustrates equation 4 of a periodic signal with noise illustrated on the left after autocorrelation being a periodic signal with little noise as illustrated on the right.

The autocorrelation is for signal plus noise as represented in FIG. 4. Most random noise signals are not correlated, i.e., they satisfy:

$$\lim_{\tau\to\infty} R_N(\tau)=0. \tag{5}$$

Figure 5:
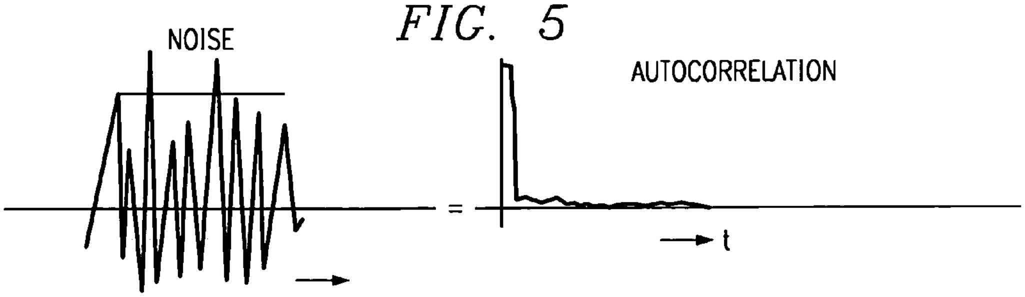
FIG. 5 illustrates equation 5 of a noise signal illustrated on the left becoming after autocorrelation zero after a short time period.

This is represented by autocorrelation in FIG. 5 as zero. Therefore, we have for large τ:

$$R_x(\tau) \approx R_s(\tau) \tag{6}$$

Therefore, for large T, the noise has no correlation function. This property says that autocorrelation function has some noise immunity.

Frequency-Selective Autocorrelation Function

In real situation, direct application of autocorrelation function to utterance detector may not give enough robustness towards noises. The reasons include:

Many noise sources are not totally random. For instance, noises recorded in a moving car present some periodicity at low frequencies.

For computational reasons, the analysis window to implement autocorrelation is typically 30–50 ms, too short to attenuate low frequency noises. One solution to that is to pre-emphasize high frequency components. However, the pre-emphasis increases high frequency noise level.

Information leading to the determination of speech periodicity is mostly contained in a frequency band, corresponding to the range of human pitch period, rather than spread over the whole frequency range. However, this fact has not been used.

We apply a filter $f(\tau)$ on the power spectrum of the autocorrelation function to attenuate the above-mentioned undesirable noisy components, as described by:

$$r_X(\tau) = R_X(\tau) * f(\tau) \tag{7}$$

Figure 6:
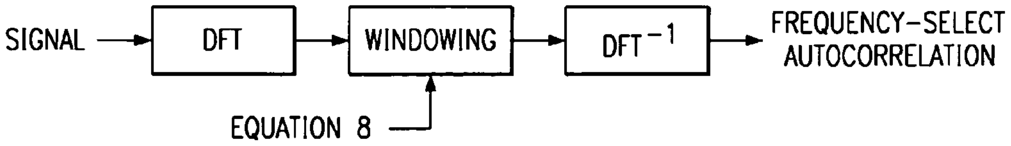
FIG. 6 illustrates a faster and lower cost computation using DFT and windowing by the filter of equation 8.

To reduce the computation as in equation 1 and equation 7, the convolution is performed in the Discrete Fourier Transform (DFT) domain, as detailed below in the implementation. We can do the same by a DFT as illustrated in FIG. 6 by taking the signal and applying DFT, then do a frequency domain windowing following the equation 8 below and then do an inverse DFT to get the autocorrelation. The filter $f(\tau)$ is specified in the frequency domain:

$$F(k) = \begin{cases} \alpha^{F_l - k} \text{ if } 0 \le k < F_l \\ 1 \text{ if } F_l \le k < F_h \\ \beta^{k - F_h} \text{ if } F_h \le k < \frac{N}{2} \end{cases} \tag{8}$$

with $$\alpha = 0.70 \tag{9}$$

$$\beta = 0.85 \tag{10}$$

where $F_l$ and $F_h$ are respectively the discrete frequency indices under given sample frequency for 600 Hz and 1800 Hz.

Figure 7A:
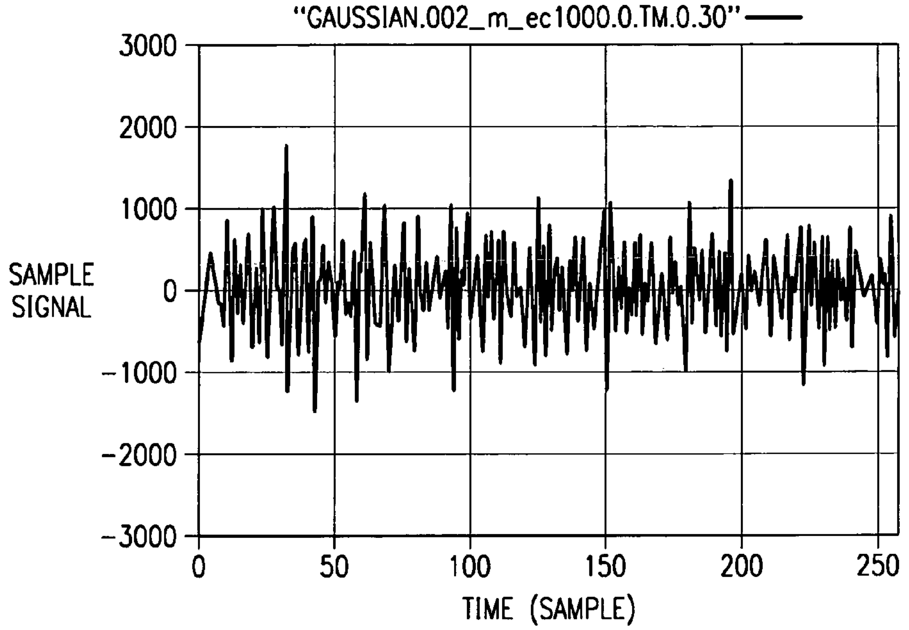
FIG. 7A is a time signal (non-speech portion) and FIG. 7B illustrates frequency-selective autocorrelation function of the time signal of FIG. 7A.
Figure 7B:
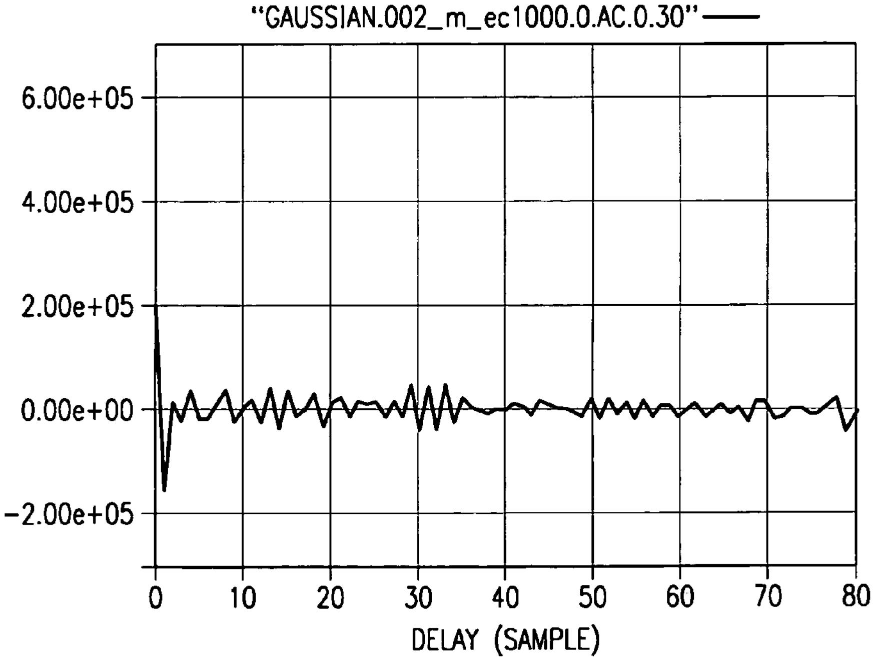
Figure 8A:
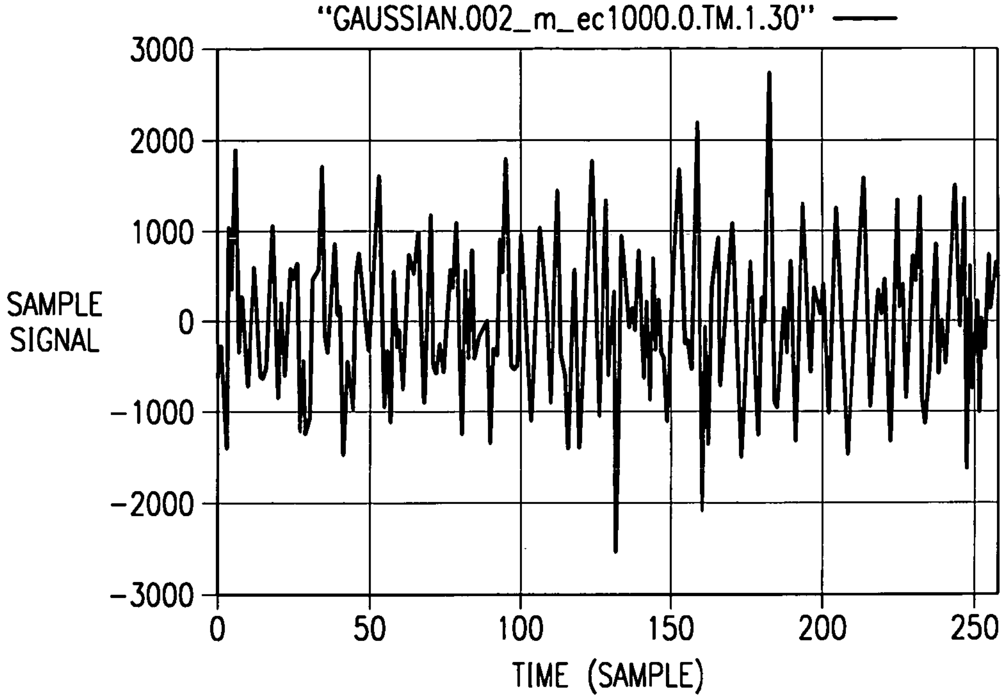
FIG. 8A is a time signal for speech and FIG. 8B illustrates frequency-selective autocorrelation function of the speech signal of FIG. 8A.
Figure 8B:
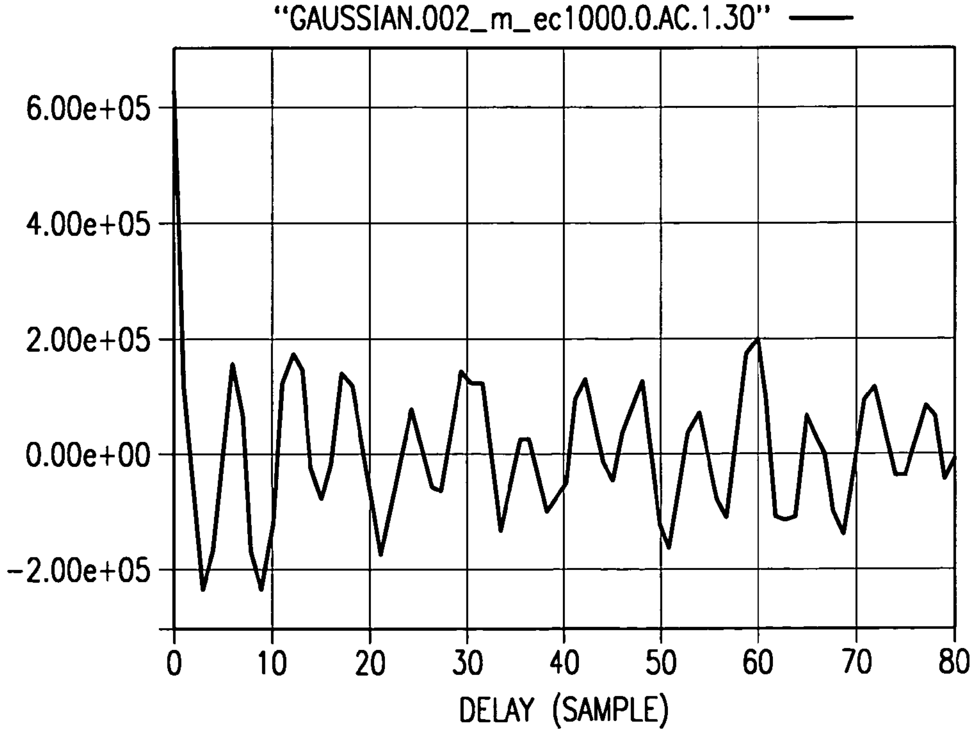

We show two plots of $r_X(\tau)$ along with the time signal. The signal has been corrupted to 0 dB SNR. FIG. 7A shows a non-speech signal and FIG. 7B the frequency selective autocorrelation of the non-speech signal. FIG. 8A shows a speech signal and FIG. 8B the frequency selective autocorrelation function. It can be seen for the speech signal, a peak at 60 in FIG. 8B can be detected, with an amplitude substantially stronger than any peak in FIG. 7B.

Search for Periodicity

The periodicity measurement is defined as:

$$p = \max_{\tau = T_l}^{T_h} r(\tau) \tag{11}$$

$T_l$ and $T_h$ are pre-specified so that the period found will range from 75 Hz to 400 Hz. A larger value of p indicates a high energy level at the time index where p is found. We decide that the signal is speech if p is larger than a threshold.

The threshold is set to be 10 dB higher than a background noise level estimation:

$$\theta = N + 10 \tag{12}$$

In FIG. 9, the curve "PRAM" shows the value of p for each of the incoming frames, the curve "DEC" shows the decision based on the threshold, and the curve "DIP" shows the evolution of the estimated background noise level.

Implementation

The calculation of the frame-wise decision is as follows:

1. calculate the power spectrum of the signal
   1.1 filter the speech signal with $H(z) = 1 - 0.96_z^{-1}$ (this filter is illustrated by FIG. 10).
   1.2 apply Hamming window $$w(i) = 0.54 - 0.46 \cos\left(\frac{2\pi}{N} i\right)$$

1.3 perform FFT on the signal from step 1.2. X(k)=DPT (X(n) where X(k) has imaginary part Im and real part Re, k is the frequency index and n is time
   1.4 calculate the power spectrum which is $|X(k)|^2 = \mathrm{Im}^2(X(k)) + \mathrm{Re}^2(X(k))$
2. perform frequency shaping
   2.1 apply Eq-8 resulting R(k)
   2.2

$$\forall k \in \left(0, \frac{N}{2}\right) R\left(\frac{N}{2} + k\right) = R\left(\frac{N}{2} - k\right)$$

to make R(k) symmetrical. As illustrated in FIG. 11 the third equation makes N/2 the center point. This is required to perform the inverse FFT.

3. perform inverse FFT of R(k), resulting $r_X(\tau)$ of Eq-7
4. Search for p, the maximum of $r_X(\tau)$ using Eq-11
5. Calculate speech/non-speech decision S
   5.1 calculate the threshold $\hbar$ using Eq-12
   5.2 ($p > \hbar$) decide "speech" else "non-speaker".

Utterance-Level Detector 13 State-Machine

To make our final utterance detection, we need to incorporate some duration constraints about speech and non-speech. The two constants are used.

MIN-VOICE-SEG: the minimum number of frames to declare a speech segment.

MIN-PAUSE-SEG: the minimum number of frames to end a speech segment.

The functioning of the detector is completely described by a state machine. A state machine has a set of states connected by paths. Our state machine, shown in FIG. 12, has four states: non-speech; pre-speech, in-speech, and pre-non-speech.

The machine has a current state, and based on the condition on the frame-wise speech/non-speech decision, will perform some action and move to a next state, as specified in Table 1.

In FIG. 12, the curve "STT: shows the state index, and the curve "LAB" labels the detected utterance.

In FIG. 12, one cycle means state. The arrow means to go to another state. The numbers are paths. Each path is defined by a condition. These are from level decisions. For each path, we need to take an action. Actions include state transitions. The action can be to do some calculation. After that action, we make a transition to the next state. In Table 1, the state is indicated by case. Suppose we need to make an utterance decision. We have four cases on states which are non-speech, pre-speech, in-speech and pre-nonspeech. We initialize on the left most case which is non-speech. We look at input. If the input frame is speech, we initialize a counter (n=1). In this case, we go to pre-speech state via path 2. If the frame level is non-speech, the system stays in the same state as represented by path 1. If in the pre-speech state and there is not enough counts of frames to indicate in-speech yet the frame is indicated or speech, we stay in pre-speech and increase the count by 1 as indicated by path 4. If the frame is speech and the count is N or greater (sufficiently long time), then it goes to the in-speech state as indicated by path 5. If the frame is not speech, then it takes the path 3 back to non-speech state. If we continue to detect speech at the frame level, we stay in the same state (path 6). If we receive a non-speech frame we move to pre-nonspeech state (path 7). If we again observe speech, we go back to in-speech state (path 8). If the next frame is non-speech, we stay in pre-nonspeech (path 9). If in pre-nonspeech for sufficiently long time (count of N) and frame input is below threshold, then we are in non-speech and the system goes to the non-speech state (path 10).

The utterance decision is represented by timing diagram (c) of FIG. 2.

We provide some pictures to show the difference between pre-emphasized energy and the proposed speech indicator based on frequency selective autocorrelation function.

TABLE 1 case assignment and actions

| CASE | CONDITION | ACTION | NEXT CASE | PATH |
|---|---|---|---|---|
| non-speech | S = speech | N = 1 | Pre-speech | 2 |
| | Sγspeech | none | Non-speech | 1 |
| pre-speech | S = speech, N < MIN-VOICE-SEG | NpN + 1 | Pre-speech | 4 |
| | S = speech, NμMIN-VOICE-SEG | start-extract | In-speech | 5 |
| | Sγspeech | none | Non-speech | 3 |
| in-speech | S = speech | none | In-speech | 6 |
| | Sγspeech | N = 1 | Pre-non-speech | 7 |
| pre-nonspeech | S = speech | none | In-speech | 8 |
| | Sγspeech, N < MIN-PUASE-SEG | NpN + 1 | Pre-non-speech | 9 |
| | Sγspeech, NμMIN-PAUSE-SEG | end-extract | Non-speech | 10 |

Figure 13A:
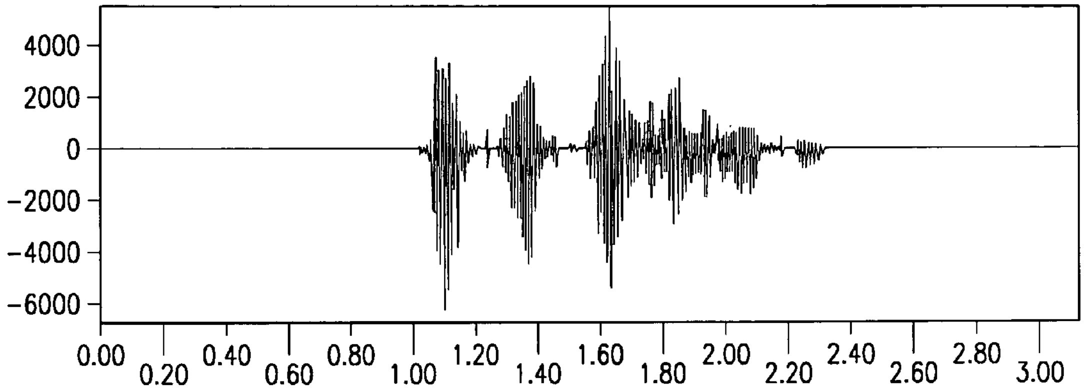
FIG. 13 illustrates time signal of a test utterance, top: no noise added, middle: 0 db SNR highway noise added, bottom: 0 db SNR white Gaussian noise added.
Figure 13B:
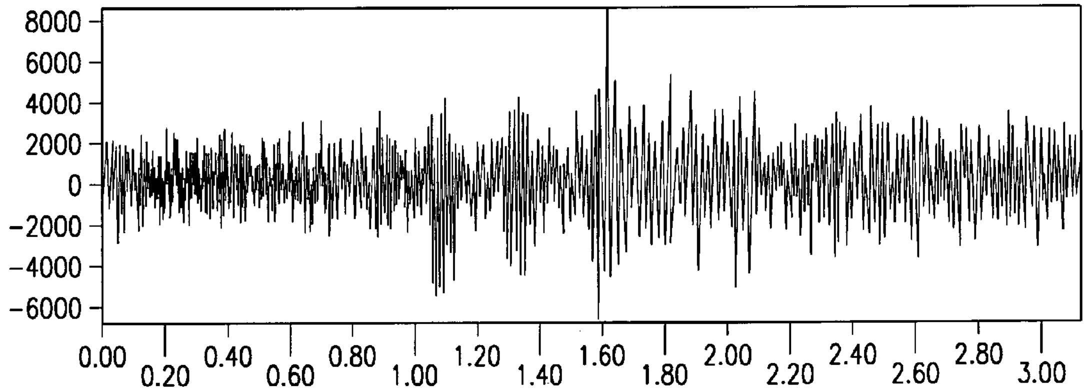
Figure 13C:
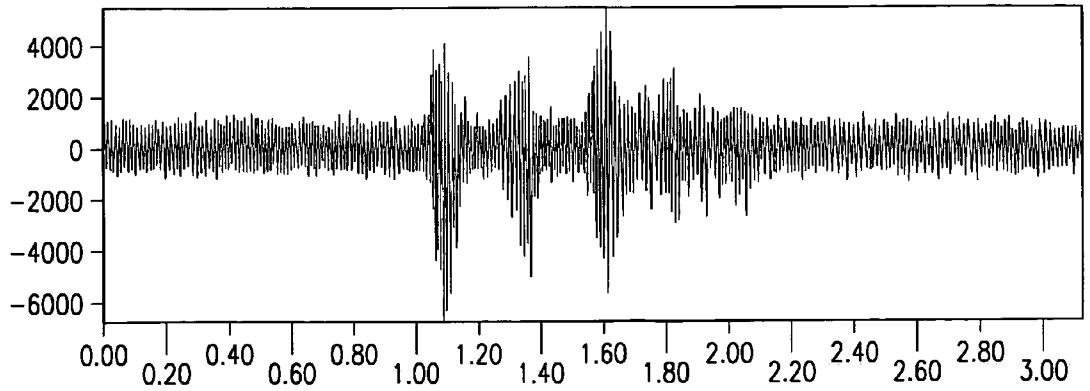

FIG. 13 shows the time signal of an utterance with no noise added, 0 dB Signal to Noise Ratio (SNR) highway noise added, and 0 dB SNR white Gaussian noise added.

Basic Autocorrelation Function

Figure 14A:
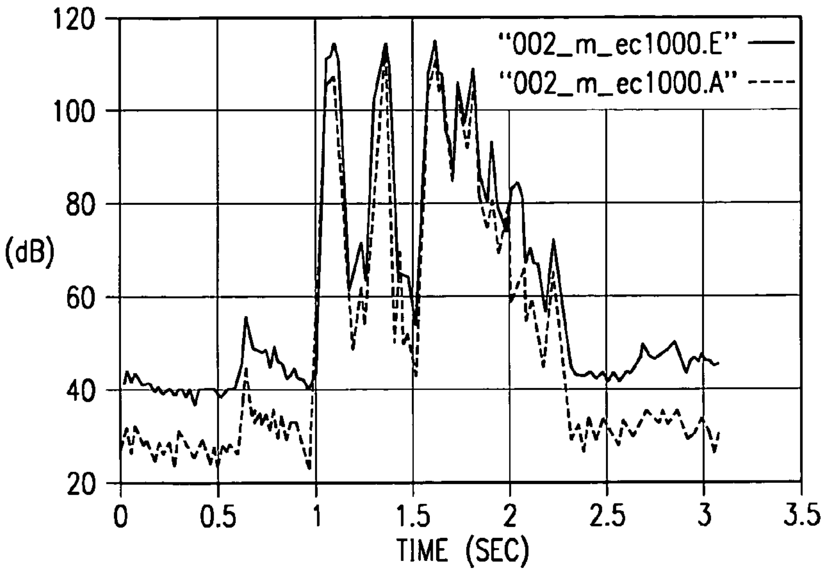
FIG. 14 illustrates comparison between energy contour (E) and autocorrelation function peak (P)
Figure 14B:
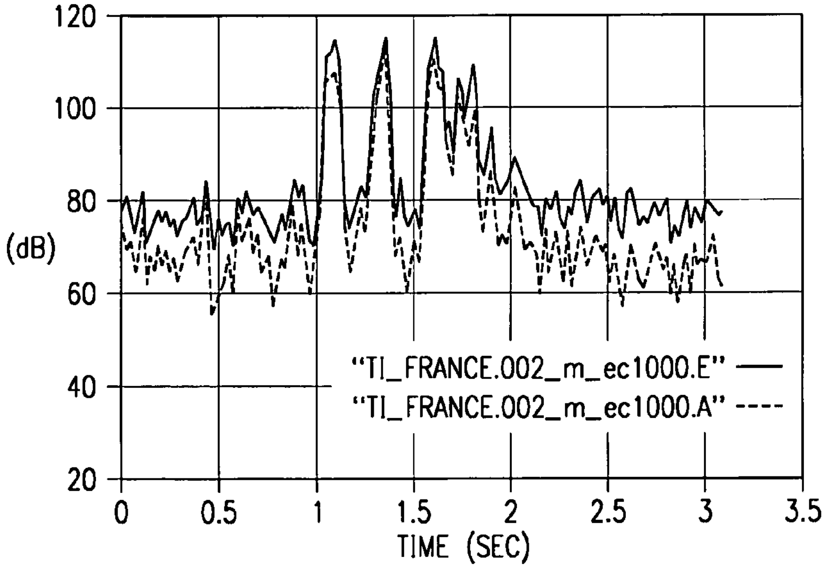
Figure 14C:
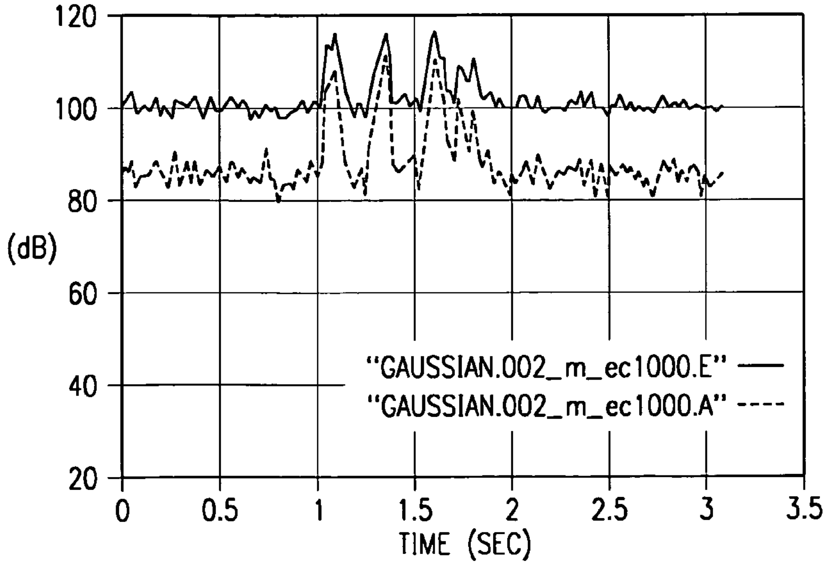

FIG. 14 compares energy and the peak value obtained by directly searching Eq-1 for peak, i.e., using basic autocorrelation. It can be observed that basic autocorrelation function based on speech indicator gives significant lower background noise level, about 10, 15 and 15 dB lower for no noise added, highway noise added, and white Gaussian noise added, respectively. On the other hand, the difference for voiced speech is only a few dB.

For instance, for the highway noise case, the background noise level of energy contour is about 80 dB, and that of p is 65 dB. Therefore, p gives about 15 dB SNR improvement over energy.

Selective-Frequency Autocorrelation Function

Figure 15A:
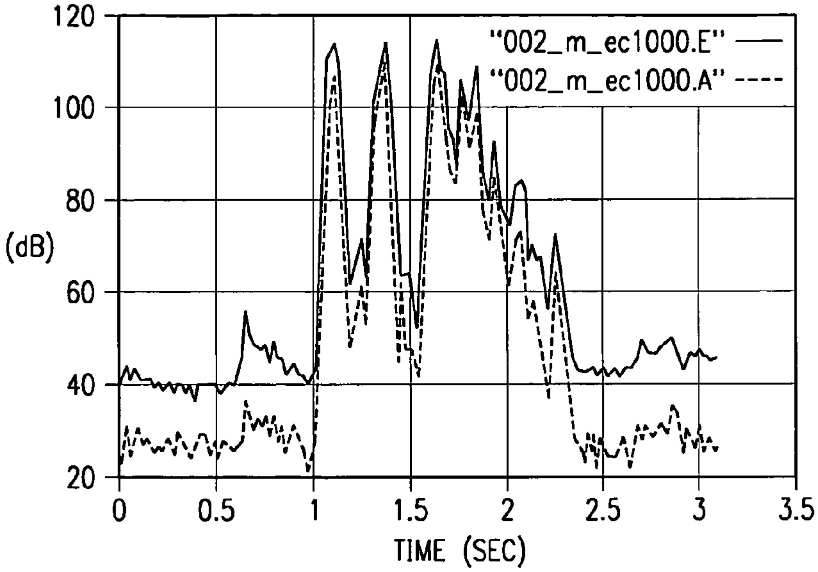
FIG. 15 illustrates comparison between energy contour (E) and selected autocorrelation peak (P)
Figure 15B:
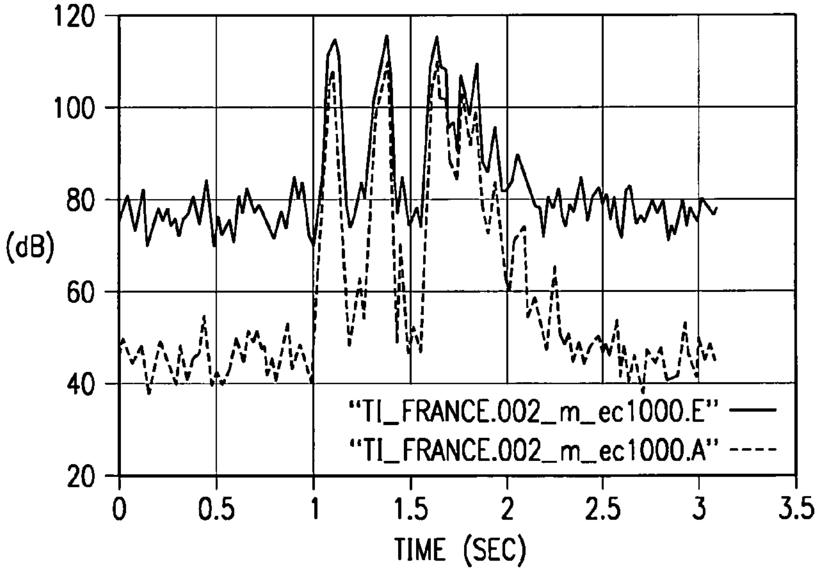
Figure 15C:
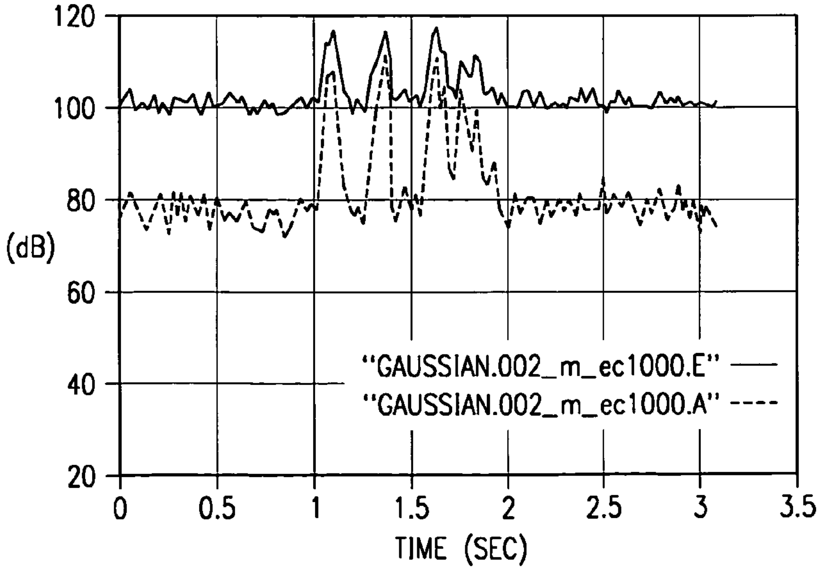

FIG. 15 compares energy and the peak value obtained by Eq-11, i.e., using selective-frequency autocorrelation. It can be observed that improved autocorrelation function based speech indicator gives further lower background noise level, about 10, 35 and 20 dB lower for no noise added, highway noise added and white Gaussian noise added, respectively.

For instance, for the highway noise case, the background noise level of energy contour is about 80 dB, and that of p is 45 dB. Therefore, p gives about 35 dB SNR improvement over energy.

Figure 16:
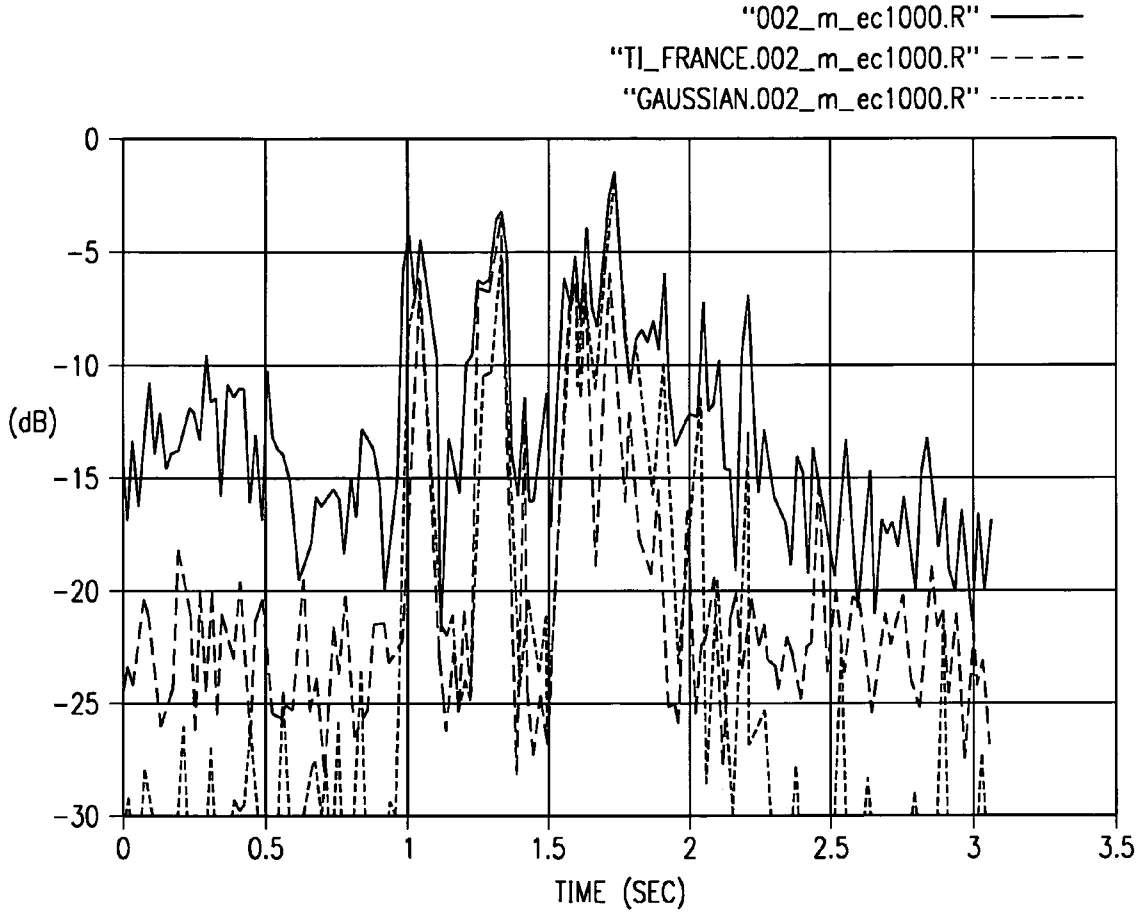
FIG. 16 illustrates a comparison between R(n) and E(n) in log scale.

The difference of the two curves in each of the plots in FIG. 15 is plotted in FIG. 16. It can be seen that p gives consistent higher value than energy in voiced speech portion, especially in noisy situations.

What is claimed is:

1. An utterance detector comprising:

a frame-level detector for making speech/non-speech decisions for each frame, and an utterance detector coupled to said frame-level detector and responsive to said speech/non-speech decisions over a period of frames to detect an utterance; said frame-level detector includes frequency-selective autocorrelation.

2. The utterance detector of claim 1, wherein said frame-level frame detector includes means for calculating power spectrum of an input signal, performing frequency shaping, performing inverse FFT and determining maximum value of periodicity.

3. The utterance detector of claim 2, wherein calculating power spectrum includes the steps of filtering the signal, applying a Hamming window and performing FFT on the signal from the Hamming window.

4. The utterance detector of claim 2, wherein said performing frequency shaping step includes the step of:

$$F(k) = \begin{cases} \alpha^{F_l - k} \text{ if } 0 \le k < F_l \\ 1 \text{ if } F_l \le k < F_h \\ \beta^{k - F_h} \text{ if } F_h \le k < \frac{N}{2} \end{cases}$$

where $F_l$ and $F_h$ are low and high frequency indices respectfully. R(k) is the autocorrelation, F(k) is a filter, and α and β are constants with

α=0.70

β=0.85 to get R(k).

5. An utterance detector comprising:

a frame-level detector for making speech/non-speech decisions for each frame, and an utterance detector coupled to said frame-level detector and responsive to said speech/non-speech decisions over a period of frames to detect an utterance; said frame-level detector includes autocorrelation; said utterance detector including filter means for performing frequency-selective autocorrelation.

6. The utterance detector of claim 5, wherein said autocorrelation and filtering is performed in DFT domain by taking the signal and applying DFT, performing frequency domain windowing and then inverse DFT.

* * * * *